July 15, 1924.

L. W. LUND 1,501,410

STARTING MEANS FOR ELECTRIC MOTORS

Filed Sept. 14, 1922

INVENTOR.
Lee W. Lund
BY Geo. Stevens
ATTORNEY.

July 15, 1924.

L. W. LUND 1,501,410

STARTING MEANS FOR ELECTRIC MOTORS

Filed Sept. 14, 1922

INVENTOR.
BY Lee W. Lund,
Geo. Stevens.
ATTORNEY.

Patented July 15, 1924.

1,501,410

UNITED STATES PATENT OFFICE.

LEE W. LUND, OF DULUTH, MINNESOTA.

STARTING MEANS FOR ELECTRIC MOTORS.

Application filed September 14, 1922. Serial No. 588,163.

*To all whom it may concern:*

Be it known that I, LEE W. LUND, a citizen of the United States, residing at Duluth, in the county of St. Louis and State of Minnesota, have invented certain new and useful Improvements in Starting Means for Electric Motors, of which the following is a specification, reference being had therein to the accompanying drawing.

This invention relates to starting means for induction electric motors and has special reference to automatic control of said starting means.

The principal object of the invention is to provide simple and effective means whereby to automatically render the starting circuit inactive when the motor attains a predetermined speed.

Other objects and advantages will appear in the further description of the invention.

Referring to the accompanying drawing forming part of this application in which like reference characters indicate like parts:

Figure 2:
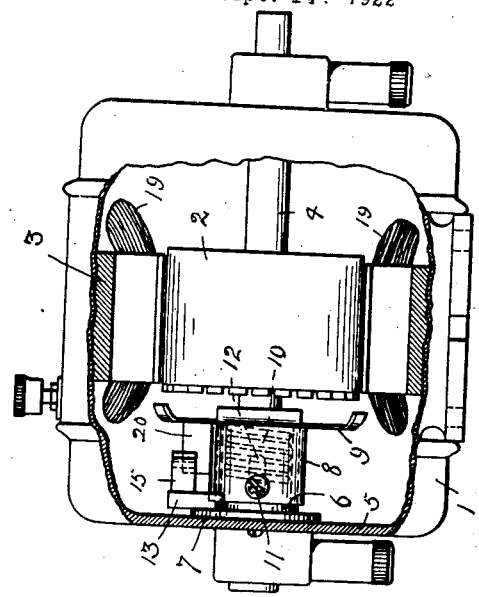
Figure 2 is a broken side elevation of the assembled motor showing the switch in elevation and portions of the interior of the motor in section.
Figure 1:
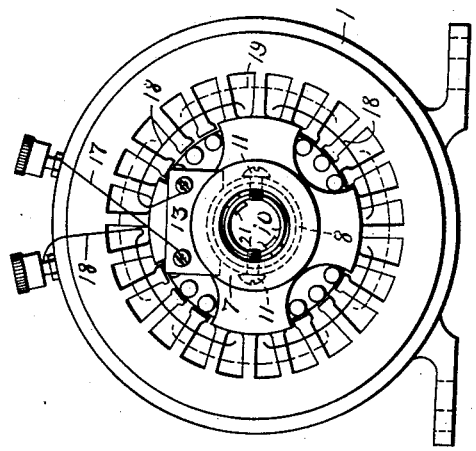
Figure 1 is an end elevation of the internal motor assembly illustrating the novel starting switch as associated therewith, and the wiring diagram.
Figure 4:
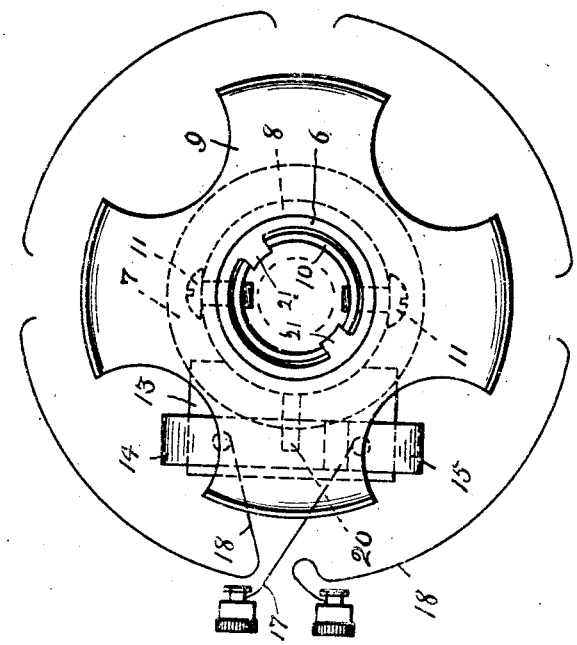
Figure 4 is a front elevation of the switch illustrating the wiring diagram.
Figure 3:
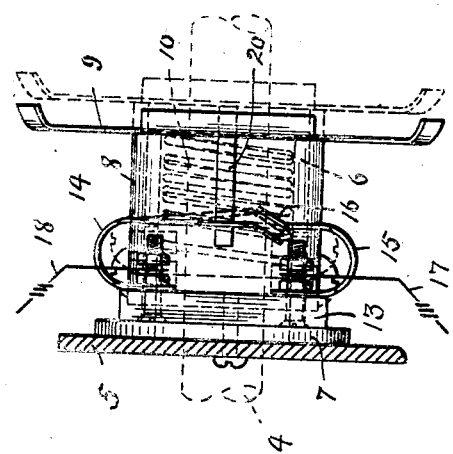
Figure 3 is a top plan view of the circuit making and breaking mechanism or switch.

1 represents the casing of the motor; 2 the rotor of the motor; 3 the stator of the motor, and 4 the rotor or armature shaft.

To the inner face of the end 5 of the motor casing is securely attached a sleeve 6 it being concentric with the shaft 4 and about same, having formed integrally therewith an annular flange 7 through which the fastening is made to the end of the casing in any desired manner.

A second sleeve 8 is reciprocably mounted upon the sleeve 6 and carries rigidly fixed to its outer end a spider shaped disc or armature 9, the extreme radially extending portions or arms of which are bent slightly towards the face of the rotor 2 of the motor but do not contact therewith, said armature being of a diameter slightly greater than the rotor of the motor, so as to be most readily effected by magnetic leakage of the motor during the initial starting of same.

The sleeve 8 is normally held in retracted position upon the sleeve 6 by means of the helical spring 10 within the latter sleeve, as the sleeve 8 carries two opposed radially disposed screws 11 protruding inwardly through the slotted openings 12 within the sleeve 6. The screws 11 are sufficiently long to be engaged by the innermost end of the spring 10, the opposite end of said spring impinging against the inwardly projecting lugs 21 of the outermost end of the sleeve 6.

Supported upon the upper portion of the annular holding flange 7 is a rectangularly shaped terminal block 13 carrying the two opposed U-shaped contact members 14 and 15, the free ends of which are turned towards each other and offset slightly as at 16, they being so shaped as to remain spaced apart normally when the reciprocal sleeve 8 is fully retracted.

The electric circuit connections to the automatic switch are indicated at 18 and 17, the former leading to the starting winding of the motor and ultimately to one pole of the automatic switch, and the latter to the other pole of the automatic switch; while the main winding of the motor is indicated at 19.

A fiber or other insulated block 20 is fastened in upright position on one edge to the upper side of the sleeve 8 and this block is provided with a notch adjacent one end into which the free end of the terminal 14 is mounted so that as the sleeve 8 with with its armature 9 is drawn outwardly the free end of the terminal 14 will contact the free end of the terminal 15, as at 16, thus closing the starting circuit. Upon the application of current to the motor, the armature 9 is drawn magnetically towards the primary and secondary members of the motor by the magnetic leakage which is set up through the combined magnetic flux of said primary and secondary members which are opposed to each other during the initial starting and previous to the rotor attaining its running speed as well known to those versed in the art.

As soon as the current flows in the starting coils, the rotor begins to revolve, and as the speed of the same increases the magnetic leakage decreases until it becomes ineffective in retaining the armature of the switch when the expansive action of the helical spring 10 will restore same to normalcy, and separate the contacts 14 and 15 as is obvious, thus breaking the starting circuit when the motor will continue in operation.

Having thus described my invention, what I claim and desire to secure by Letters Patent is:

1. The combination with an induction motor having a main motor winding and an auxiliary starting winding, of an automatically controlled starting switch therefor comprising two telescopically mounted sleeves concentric with the armature of the motor, the outermost one of said sleeves being reciprocable and carrying an armature thereupon, two normally spaced contact points within said switch, an expansive spring for holding the telescopic sleeves in their retracted position with the contact points thus spaced apart, and means whereby the contact points are engaged by the outward reciprocation of the outer sleeve when influenced by magnetic leakage during the initial starting of the motor.

2. A motor control of the character described comprising a non-rotatable reciprocable armature concentric with the rotor of the motor, means cooperatively associated with said armature for making and breaking the starting circuit, said armature being actuated in one direction by the magnetic leakage of the motor and in the opposite direction by a spring, substantially as described.

In testimony whereof I hereunto affix my signature in the presence of two witnesses.

LEE W. LUND.

Witnesses:
S. C. BRONSON,
S. GEO. STEVENS.